2,897,165
WATER-IN-LACQUER EMULSION COMPRISING ALKYD RESIN, SOLVENT AND WATER

Charles S. Rowland, Tenafly, and Helen D. Zucker, Paramus, N.J., assignors to Interchemical Corporation, New York, N.Y., a corporation of Ohio No Drawing. Application April 29, 1955
Serial No. 505,028

2 Claims. (Cl. 260—19)

This invention relates to water-in-lacquer textile decorating emulsions and is particularly concerned with the provision of such emulsions characterized by unusual stability and being capable of use in producing pigmented decorated textiles having good washfastness and especially good alkali resistance.

Pigmented water-in-lacquer emulsions are used extensively in the printing of textiles, especially cotton textiles. United States Patents 2,222,581; 2,222,582; 2,364,692; 2,558,053 and 2,691,005 disclose and claim various aspects of the pigmented water-in-lacquer textile printing system. The pigmented water-in-lacquer textile printing pastes will generally contain a thermo-setting resin dissolved in the lacquer which will act as a binder resin to bind the pigment to the textile fabric. Alkyd resins, usually fatty oil modified, are generally used as emulsifying agents to produce stable water-in-oil type emulsions. The alkyd will also furnish some binder action and will act as plasticizer for the thermosetting resin. Heating of a textile fabric printed with such an emulsion printing paste will cure the binder resins to an insoluble thermoset state which binds the pigment to the cloth. The alkyd resin used as emulsifier in the emulsion has a harmful effect on washfastness and fastness to strong alkali solutions, i.e. alkali resistance. The alkali resistance of the pigment printed textile is of great importance where the fabric is to be treated with strong alkali, e.g. as in producing a plissé or crepe effect on the printed fabric. It is therefore desirable in the trade to use alkyd resins that provide stable emulsions and also provide prints that are resistant to alkali.

We have now discovered that unusually stable water-in-lacquer textile printing emulsions can be prepared by utilizing, as an ingredient thereof, an alkyd resin comprising the heat reaction product of phthalic anhydride, fatty oil acid, a polymeric polyhydric alcohol having alternating aliphatic chains and aromatic nuclei united through ether oxygen and containing 5 to 20 alcoholic hydroxyl groups per molecule, and a formaldehyde-phenoxyethanol condensate. Also prints on textiles made with pigmented water-in-lacquer emulsions containing such an alkyd as the emulsifier and stabilizer exhibit excellent fastness to washing and excellent resistance to the action of alkali. The special alkyd is used to replace all or a portion of the conventional alkyd used in water-in-oil print pastes.

The special alkyd resin is prepared in conventional manner for preparing fatty oil acid modified alkyds except, of course, that the polymeric polyhydric alcohol and the formaldehyde-phenoxyethanol condensate are substituted for the conventionally used polyhydric alcohol such as glycerol. Thus a preferred method of forming the alkyd is to first esterify the fatty oil acid with the polymeric polyhydric alcohol and formaldehyde-phenoxyethanol condensate by heating at 450 to 490° F. until an acid number of three or less is obtained. After cooling to 340 to 350° F. the phthalic anhydride is added and heating is then continued at 375° to 400° F. until the resin has attained the desired viscosity, viz. at least 30 poises as measured on a 50% solution of the resin in xylene at 25° C.

The alkyd is preferably prepared using on the order of 1 to 1.5 equivalents of fatty oil acid, preferably soya fatty acids, for each equivalent of phthalic anhydride. The total weight of polymeric polyhydric alcohol and phenoxyethanol-formaldehyde condensate should be at least equal but not more than about 1.5 times the combined weight of phthalic anhydride and fatty oil acid. Preferably .25 to 2 parts by weight of the polymeric polyhydric alcohol is used for each part of phenoxyethanol-formaldehyde condensate.

Polymeric polyhydric alcohols as defined above include those made from 4,4'-dihydroxy diphenyl dimethyl methane or commercial mixtures of this 4,4'-isomer with lesser amounts of the 2,2'- and 4,2'-isomers (i.e. Bisphenol A), and epichlorhydrin. Such products are commercially available, e.g. Epon or Araldite resins. Of the various commercial resins available, ranging from 5 to 20 hydroxyl groups per molecule and having molecular weights on the order of 400 to 4000, we especially prefer the relatively low molecular weight material such as Epon 1001, which has a molecular weight on the order of 900 and contains approximately 7 hydroxyl groups per molecule.

The phenoxyethanol-formaldehyde condensate is an acid catalyzed condensate of substantially equal molecular proportions of phenoxyethanol and formaldehyde having a melting point on the order of 75° or above.

Although various fatty oil acids can be used, including linseed fatty acids, dehydrated castor oil fatty acids, and the like, we especially prefer to use a resin made with soya fatty acids.

Typical resins used in the water-in-oil emulsions of the present invention are made, for example, from the following amounts of reactants:

SPECIAL RESIN "A"

| | Parts by weight |
|---|---|
| Epon 1001 | 10.80 |
| Phenoxyethanol-formaldehyde condensate, as described above, M.P. 76° C | 10.80 |
| Soya fatty acids | 14.30 |
| Phthalic anhydride | 2.86 |

SPECIAL RESIN "B"

| | |
|---|---|
| Epon 1001 | 40.1 |
| Phenoxyethanol-formaldehyde condensate as described above, M.P. 76° C | 19.8 |
| Soya fatty acids | 40.0 |
| Phthalic anhydride | 7.5 |

The above resins, when used in conjunction with organic solvent soluble thermosetting aminoplast resins and ethyl cellulose, provide water-in-lacquer printing emulsions furnishing good plissé resistance. Aminoplast resins that are used are those conventionally used in water-in-lacquer textile print pastes, e.g. organic solvent soluble melamine-formaldehyde resin and urea-formaldehyde resins. Ethyl cellulose used in the invention is of the organic solvent soluble, high ethylated type, i.e. containing 44 to 50% ethoxy.

When the emulsions have to be stored for considerable periods of time before they are used, e.g. for several weeks or months, it is necessary to stabilize the emulsion with a small amount of a basic material. Triethylamine has been found to be especially effective for this stabilization, being much more effective than inorganic alkali such as sodium hydroxide or ammonium hydroxide. The amount of triethylamine necessary to stabilize the emulsion is on the order of 1 to 3% by weight based on the combined weights of alkyd resin, thermosetting resin and ethyl cellulose. The total amount of alkyd resin in the emulsion will generally be 1 to 2 times the weight of thermosetting resin, while the amount of thermosetting resin will generally be 5 to 10 times the weight of ethyl cellulose. Although the total amount of nonvolatile film forming material in the emulsion is not critical, it is desirable to have it as low as possible and still have a stable "cut" or extender clear. Stable "cut" clears containing as low as 0.5% to 1% of total nonvolatile film forming material can be made in accordance with the invention.

The following examples will illustrate the water-in-lacquer print pastes of the present invention:

*Example 1*

A. CONCENTRATE CLEAR

A clear, unpigmented, concentrate emulsion is made by emulsifying an aqueous phase consisting of—

| | Parts |
|---|---|
| Triethylamine | 0.5 |
| 35% aqueous diammonium phosphate solution | 25.0 |
| Water | 16.6 | into a water-immiscible organic phase consisting of

| | |
|---|---|
| Special resin "A," described above, viscosity 15–30 poises (50% solution in xylene) | 14.5 |
| Medium oil length tall oil-phthalic glycerol alkyd (50% solution in xylene) | 14.5 |
| Butylated melamine-formaldehyde resin as 65% solution in xylene | 16.5 |
| Ethyl cellulose (T-type, 45% ethoxy) | 1.3 |
| Volatile, water-immiscible, organic solvent | 11.1 |

The ethyl cellulose is preferably added as a previously prepared solution in volatile water-immiscible solvents, e.g. turpentine and xylol or a mixture of these with a small amount of octyl alcohol.

B. CUT CLEAR

The above concentrate clear emulsion is "cut" to a clear printing paste extender as follows:

| | |
|---|---|
| Varsol #2 | 28.0 |
| is added to | |
| Concentrate clear "A" | 2.5 |
| and then | |
| Water | 69.5 | is emulsified therein to give a water-in-oil type emulsion of printing consistency. This cut clear emulsion is used to extend or dilute pigment dispersions to produce the desired shade of printing on the textile.

In similar manner concentrate clears and cut clears are produced from the following ingredients:

*Example 2*

A. CONCENTRATE CLEAR

| | Parts |
|---|---|
| Special alkyd as described above, viscosity 1–3 poises, 50% solution in xylene | 20.4 |
| Tall oil alkyd solution as in Example 1 | 20.4 |
| Ethyl cellulose solution as in Example 1 | 17.6 |
| Triethylamine | 0.5 |
| 35% aqueous diammonium phosphate solution | 25.0 |
| Water | 16.6 |

B. CUT CLEAR

| | |
|---|---|
| Concentrate clear | 1.45 |
| 50% solution of butylated melamine-formaldehyde resin in 25% butanol and 25% xylene | 0.39 |
| Varsol #2 | 28.66 |
| Water | 69.50 |

*Example 3*

A. CONCENTRATE CLEAR

| | Parts |
|---|---|
| Special alkyd as described above, viscosity 1–3 poises, 50% solution in xylene | 20.4 |
| Ethyl cellulose solution as in Example 1 | 17.6 |
| Medium oil length soya-phthalic-glycerol alkyd as 50% solution in xylene | 20.4 |
| Triethylamine | 0.5 |
| 35% Aqueous diammonium phosphate solution | 25.0 |
| Water | 16.6 |

B. CUT CLEAR

| | |
|---|---|
| Concentrate clear | 1.6 |
| 50% solution of butylated melamine-formaldehyde resin in 25% butanol and 25% xylene | 0.4 |
| Varsol #2 | 28.5 |
| Water | 69.5 |

*Example 4*

A. CONCENTRATE CLEAR

| | |
|---|---|
| Special alkyd as described above, viscosity 1–3 poises 50% solution in xylene | 58.9 |
| 35% aqueous diammonium phosphate solution | 25.0 |
| Water | 16.1 |

B. CUT CLEAR

| | |
|---|---|
| Concentrate clear | 1.7 |
| Varsol #2 | 23.8 |
| Water | 74.5 |

*Example 5*

A. CONCENTRATE CLEAR

| | Parts |
|---|---|
| Special alkyd as described above, viscosity 1–3 poises, 50% solution in xylene | 58.9 |
| 35% aqueous diammonium phosphate solution | 25.0 |
| Water | 16.1 |

B. CUT CLEAR

| | |
|---|---|
| Concentrate clear | 1.3 |
| 50% solution of butylated melamine formaldehyde resin in 25% butanol and 25% xylene | 0.4 |
| Varsol #2 | 21.8 |
| Water | 76.5 |

The volatile, water-immiscible organic solvent that is used in the clears consists predominantly of hydrocarbon solvents that are readily vaporizable at temperatures on the order of 200 to 250° F. and preferably consists of such solvents that are composed predominantly of aliphatic hydrocarbons. Petroleum hydrocarbon solvent, boiling range 306–394° F., kauri-butanol value 33–45, e.g. Varsol #2, is typical of such solvents. Predominantly aromatic, or terpenic hydrocarbon solvents are preferably used in preparing the concentrate clears.

The above clear emulsions are used in the ratios required to produce the desired shade of color with the particle pigment dispersion that is to be used. For instance, the cut clears can be used as extenders for the concentrate colors of Examples 2 and 3 of Patent 2,691,005.

It will be understood that the practice of the invention is not limited to textile decorating compositions formulated in accordance with the specific examples which have been described above, but that various modifications may be made therein without departing from the scope of the invention as it is defined in the appended claims.

We claim:

1. A water-in-lacquer textile decorating emulsion, the water phase of which comprises water and diammonium phosphate, and the lacquer phase of which comprises a volatile water-immiscible organic solvent containing, as an emulsifying resin, an alkyd resin having an acid number of no more than 3, said alkyd resin consisting of the reaction product of (A) phthalic anhydride, (B) fatty oil acids selected from the group consisting of soya fatty acids, linseed fatty acids, and dehydrated castor oil fatty acids, the weight of said fatty oil acids being between about 4 and about 6 times the weight of said phthalic anhydride, (C) an acid catalyzed phenoxyethanol-formaldehyde condensate having a melting point on the order of 75° C. and prepared from a substantially equimolar mixture of phenoxyethanol and formaldehyde, and (D) a linear polymeric polyhydric alcohol having aliphatic chains and aromatic nuclei united through ether oxygen and having 5 to 20 hydroxyl groups per molecule and having a molecular weight between about 400 and 4000, the said polymeric polyhydric alcohol having been made by condensing dihydroxydiphenyl dimethyl methane with epichlorohydrin in the presence of alkali; the weight ratio of phenoxyethanol-formaldehyde condensate and linear polymeric polyhydric alcohol varying between 4:1 and 1:2 and their total weight being at least equal to the combined weight of said phthalic anhydride and said fatty oil acid and not more than one-and-one-half times said combined weight.

2. A water-in-lacquer textile decorating emulsion as claimed in claim 1 wherein the fatty oil acid is a soya fatty acid and the polymeric polyhydric alcohol has approximately 7 alcoholic hydroxyl groups per molecule.

References Cited in the file of this patent

UNITED STATES PATENTS

| | | |
|---|---|---|
| 2,504,518 | Greenlee | Apr. 18, 1950 |
| 2,637,621 | Auer | May 5, 1953 |

FOREIGN PATENTS

| | | |
|---|---|---|
| 364,042 | Germany | Nov. 16, 1922 |